United States Patent
Jeong et al.

(10) Patent No.: US 12,413,934 B2
(45) Date of Patent: Sep. 9, 2025

(54) METHOD AND APPARATUS FOR DETERMINATION AND REPORTING OF UE POSITION IN AN NTN

(71) Applicant: Samsung Electronics Co., Ltd., Suwon-si (KR)

(72) Inventors: Kyeongin Jeong, Allen, TX (US); Nishithkumar D. Tripathi, Parker, TX (US); Aristides Papasakellariou, Houston, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 594 days.

(21) Appl. No.: 17/716,868

(22) Filed: Apr. 8, 2022

(65) Prior Publication Data

US 2022/0329975 A1 Oct. 13, 2022

Related U.S. Application Data

(60) Provisional application No. 63/192,889, filed on May 25, 2021, provisional application No. 63/186,589, filed on May 10, 2021, provisional application No. 63/174,905, filed on Apr. 14, 2021, provisional application No. 63/173,936, filed on Apr. 12, 2021.

(51) Int. Cl.
*H04W 4/029* (2018.01)
*G01S 19/51* (2010.01)

(52) U.S. Cl.
CPC ............. *H04W 4/029* (2018.02); *G01S 19/51* (2013.01)

(58) Field of Classification Search
CPC .................. H04W 84/06; Y02D 30/70
See application file for complete search history.

(56) References Cited

U.S. PATENT DOCUMENTS

| 7,139,820 | B1 | 11/2006 | O'Toole, Jr. et al. |
| 2013/0217408 | A1* | 8/2013 | DiFazio ................ H04W 4/02 455/456.1 |
| 2017/0212207 | A1* | 7/2017 | Sheynblat ............ H04W 64/00 |
| 2020/0178135 | A1 | 6/2020 | Yun et al. |
| 2021/0029658 | A1 | 1/2021 | Mahalingam et al. |
| 2021/0037496 | A1 | 2/2021 | Ryu et al. |
| 2021/0212151 | A1* | 7/2021 | Paladugu ............ H04W 76/28 |

(Continued)

FOREIGN PATENT DOCUMENTS

| KR | 10-2020-0067091 A | 6/2020 |
| KR | 10-2020-0086217 A | 7/2020 |

OTHER PUBLICATIONS

International Search Report and Written Opinion issued Jul. 19, 2022 regarding International Application No. PCT/KR2022/005200, 7 pages.

(Continued)

*Primary Examiner* — Fabricio R Murillo Garcia

(57) ABSTRACT

Methods and apparatuses for reporting UE location information in a wireless communication system. A method of operating a UE comprises: receiving, from a base station (BS) in a non-terrestrial network (NTN), a message requesting to report the UE location information; generating, based on a positioning operation, first UE location information; generating second UE location information that is derived from the first UE location information; and transmitting, to the BS, the second UE location information as the UE location information.

20 Claims, 10 Drawing Sheets

(56) References Cited

U.S. PATENT DOCUMENTS

| | | | |
|---|---|---|---|
| 2022/0060959 A1* | 2/2022 | Atungsiri | H04W 36/328 |
| 2022/0086715 A1 | 3/2022 | Hong et al. | |
| 2023/0041847 A1* | 2/2023 | Wang | H04W 74/0833 |
| 2024/0008130 A1* | 1/2024 | Kim | H04W 76/20 |

OTHER PUBLICATIONS

Thales, "Considerations on UL timing and frequency synchronization", 3GPP TSG RAN WG1 Meeting #102-e, R1-2006674, Aug. 2020, 13 pages.

"5G; NR; Physical channels and modulation (3GPP TS 38.211 version 16.4.0 Release 16)", ETSI TS 138 211 V16.4.0, Jan. 2021, 137 pages.

"5G; NR; Multiplexing and channel coding (3GPP TS 38.212 version 16.4.0 Release 16)", ETSI TS 138 212 V16.4.0, Jan. 2021, 155 pages.

"3rd Generation Partnership Project; Technical Specification Group Radio Access Network; NR; Physical layer procedures for control (Release 16)", 3GPP TS 38.213 v16.4.0, Dec. 2020, 181 pgs.

"3rd Generation Partnership Project; Technical Specification Group Radio Access Network; NR; Physical layer procedures for data (Release 16)", 3GPP TS 38.214 v16.4.0, Dec. 2020, 169 pgs.

"3rd Generation Partnership Project; Technical Specification Group Radio Access Network; NR; Medium Access Control (MAC) protocol specification (Release 16)", 3GPP TS 38.321 v16.3.0, Dec. 2020, 156 pgs.

"3rd Generation Partnership Project; Technical Specification Group Radio Access Network; NR; Radio Resource Control (RRC) protocol specification (Release 16)", 3GPP TS 38.331 v16.3.1, Jan. 2021, 932 pgs.

Extended European Search Report issued Jun. 18, 2024 regarding Application No. 22788371.7, 8 pages.

\* cited by examiner

METHOD AND APPARATUS FOR DETERMINATION AND REPORTING OF UE POSITION IN AN NTN

CROSS-REFERENCE TO RELATED APPLICATIONS AND CLAIM OF PRIORITY

The present application claims priority to:
U.S. Provisional Patent Application No. 63/173,936, filed on Apr. 12, 2021;
U.S. Provisional Patent Application No. 63/174,905, filed on Apr. 14, 2021;
U.S. Provisional Patent Application No. 63/186,589, filed on May 10, 2021; and
U.S. Provisional Patent Application No. 63/192,889, filed on May 25, 2021. The content of the above-identified patent document is incorporated herein by reference.

TECHNICAL FIELD

The present disclosure relates generally to wireless communication systems and, more specifically, the present disclosure relates to a determination and reporting of user equipment (UE) position in a non-terrestrial network (NTN).

BACKGROUND

5th generation (5G) or new radio (NR) mobile communications is recently gathering increased momentum with all the worldwide technical activities on the various candidate technologies from industry and academia. The candidate enablers for the 5G/NR mobile communications include massive antenna technologies, from legacy cellular frequency bands up to high frequencies, to provide beamforming gain and support increased capacity, new waveform (e.g., a new radio access technology (RAT)) to flexibly accommodate various services/applications with different requirements, new multiple access schemes to support massive connections, and so on.

SUMMARY

The present disclosure relates to wireless communication systems and, more specifically, the present disclosure relates to a determination and reporting of UE position in an NTN.

In one embodiment, a UE for reporting UE location information is provided. the UE comprises a transceiver configured to receive, from a BS in an NTN, a message requesting to report the UE location information. The UE further comprises a processor operably coupled to the transceiver, the processor configured to generate, based on a positioning operation, first UE location information and generate second UE location information that is derived from the first UE location information, wherein the transceiver of the UE is further configured to transmit, to the BS, the second UE location information as the UE location information.

In another embodiment, a BS for receiving UE location information is provided. The BS comprises a processor and a transceiver operably coupled with the processor, the transceiver configured to: transmit, to a UE in an NTN, a message requesting to report the UE location information and receive, from the UE, the UE location information that is determined from second UE location information, wherein second UE location information is derived from first UE location information that is determined based on a positioning operation of the UE.

In yet another embodiment, a method of a UE for reporting UE location information is provided. The method comprises: receiving, from a BS in an NTN, a message requesting to report the UE location information; generating, based on a positioning operation, first UE location information; generating second UE location information that is derived from the first UE location information; and transmitting, to the BS, the second UE location information as the UE location information.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system, or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

FIG. 1 through FIG. 10, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

The following documents are hereby incorporated by reference into the present disclosure as if fully set forth herein: 3GPP TS 38.211 v16.4.0, "NR; Physical channels and modulation"; 3GPP TS 38.212 v16.4.0, "NR; Multiplexing and Channel coding"; 3GPP TS 38.213 v16.4.0, "NR; Physical Layer Procedures for Control"; 3GPP TS 38.214 v16.4.0, "NR; Physical Layer Procedures for Data"; 3GPP TS 38.321 v16.3.0, "NR; Medium Access Control (MAC) protocol specification"; and 3GPP TS 38.331 v16.3.1, "NR; Radio Resource Control (RRC) Protocol Specification."

Figure 1:
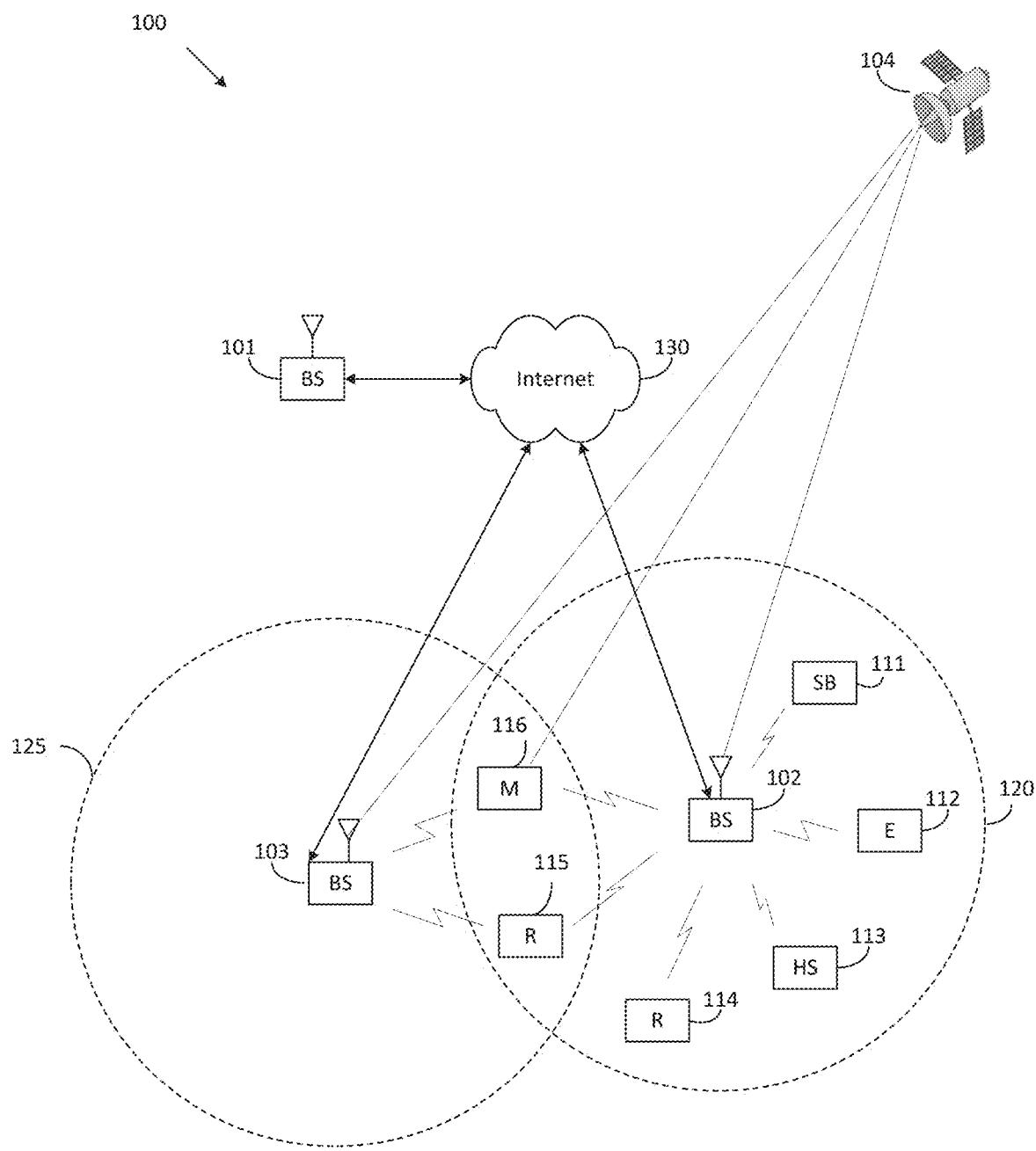
FIG. 1 illustrates an example of wireless network according to embodiments of the present disclosure.
Figure 2:
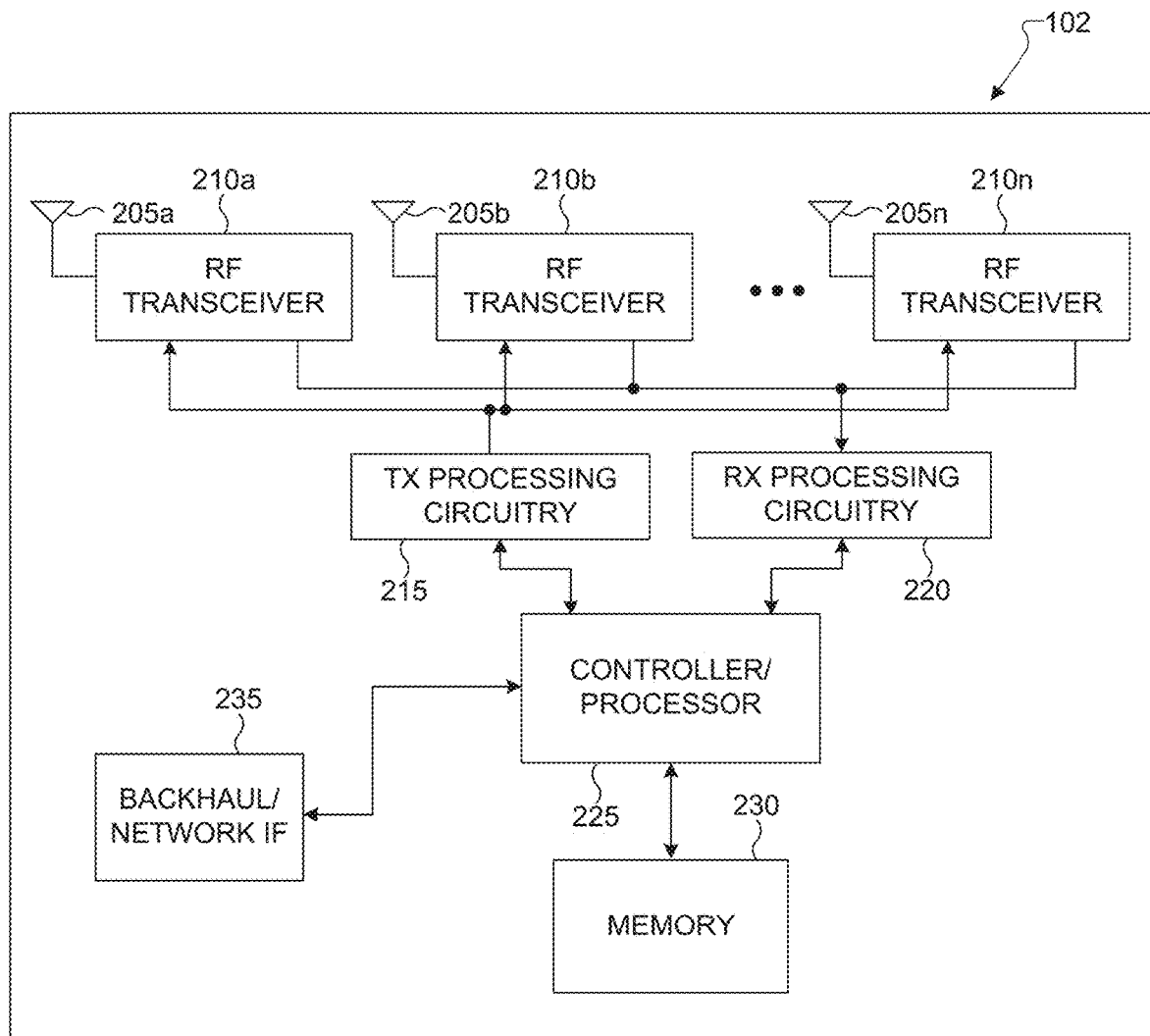
FIG. 2 illustrates an example of gNB according to embodiments of the present disclosure.
Figure 3:
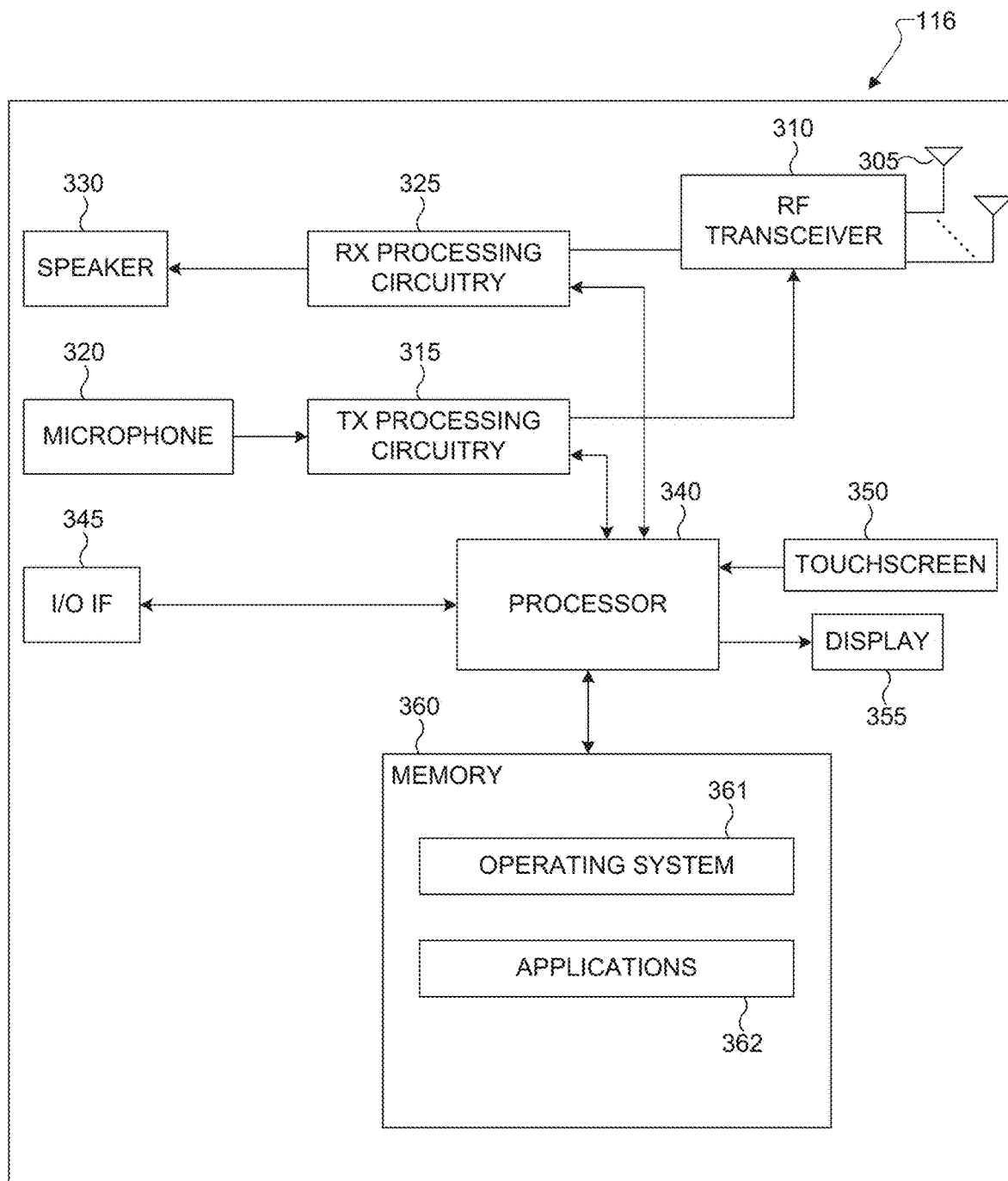
FIG. 3 illustrates an example of UE according to embodiments of the present disclosure.

FIGS. 1-3 below describe various embodiments implemented in wireless communications systems and with the use of orthogonal frequency division multiplexing (OFDM) or orthogonal frequency division multiple access (OFDMA) communication techniques. The descriptions of FIGS. 1-3 are not meant to imply physical or architectural limitations to the manner in which different embodiments may be implemented. Different embodiments of the present disclosure may be implemented in any suitably-arranged communications system.

FIG. 1 illustrates an example wireless network according to embodiments of the present disclosure. The embodiment of the wireless network shown in FIG. 1 is for illustration only. Other embodiments of the wireless network 100 could be used without departing from the scope of this disclosure.

As shown in FIG. 1, the wireless network includes a gNB 101 (e.g., base station, BS), a gNB 102, and a gNB 103. The gNB 101 communicates with the gNB 102 and the gNB 103. The gNB 101 also communicates with at least one network 130, such as the Internet, a proprietary Internet Protocol (IP) network, or other data network.

The gNB 102 provides wireless broadband access to the network 130 for a first plurality of user equipments (UEs) within a coverage area 120 of the gNB 102. The first plurality of UEs includes a UE 111, which may be located in a small business; a UE 112, which may be located in an enterprise (E); a UE 113, which may be located in a WiFi hotspot (HS); a UE 114, which may be located in a first residence (R); a UE 115, which may be located in a second residence (R); and a UE 116, which may be a mobile device (M), such as a cell phone, a wireless laptop, a wireless PDA, or the like. The gNB 103 provides wireless broadband access to the network 130 for a second plurality of UEs within a coverage area 125 of the gNB 103. The second plurality of UEs includes the UE 115 and the UE 116. In some embodiments, one or more of the gNBs 101-103 may communicate with each other and with the UEs 111-116 using 5G/NR, long term evolution (LTE), long term evolution-advanced (LTE-A), WiMAX, WiFi, or other wireless communication techniques.

Depending on the network type, the term "base station" or "BS" can refer to any component (or collection of components) configured to provide wireless access to a network, such as transmit point (TP), transmit-receive point (TRP), an enhanced base station (eNodeB or eNB), a 5G/NR base station (gNB), a macrocell, a femtocell, a WiFi access point (AP), or other wirelessly enabled devices. Base stations may provide wireless access in accordance with one or more wireless communication protocols, e.g., 5G/NR 3GPP NR, long term evolution (LTE), LTE advanced (LTE-A), high speed packet access (HSPA), Wi-Fi 802.11a/b/g/n/ac, etc. For the sake of convenience, the terms "BS" and "TRP" are used interchangeably in this patent document to refer to network infrastructure components that provide wireless access to remote terminals. Also, depending on the network type, the term "user equipment" or "UE" can refer to any component such as "mobile station," "subscriber station," "remote terminal," "wireless terminal," "receive point," or "user device." For the sake of convenience, the terms "user equipment" and "UE" are used in this patent document to refer to remote wireless equipment that wirelessly accesses a BS, whether the UE is a mobile device (such as a mobile telephone or smartphone) or is normally considered a stationary device (such as a desktop computer or vending machine).

Dotted lines show the approximate extents of the coverage areas 120 and 125, which are shown as approximately circular for the purposes of illustration and explanation only. It should be clearly understood that the coverage areas associated with gNBs, such as the coverage areas 120 and 125, may have other shapes, including irregular shapes, depending upon the configuration of the gNBs and variations in the radio environment associated with natural and man-made obstructions.

As discussed in greater detail below, the wireless network 100 may have communications facilitated via one or more communication satellite(s) 104 that may be in obit over the earth. The communication satellite(s) 104 can communicate directly with the BSs 102 and 103 to provide network access, for example, in situations where the BSs 102 and 103 are remotely located or otherwise in need of facilitation for network access connections beyond or in addition to traditional fronthaul and/or backhaul connections. Various of the UEs (e.g., as depicted by UE 116) may be capable of at least some direct communication and/or localization with the communication satellite(s) 104, for example, to receive positional information or coordinates.

A non-terrestrial network (NTN) refers to a network, or segment of networks using RF resources on board a communication satellite (or unmanned aircraft system platform) (e.g., communication satellite(s) 104). Considering the capabilities of providing wide coverage and reliable service, an NTN is envisioned to ensure service availability and continuity ubiquitously. For instance, an NTN can support communication services in unserved areas that cannot be covered by conventional terrestrial networks, in underserved areas that are experiencing limited communication services, for devices and passengers on board moving platforms, and for future railway/maritime/aeronautical communications, etc.

As described in more detail below, one or more of the UEs 111-116 include circuitry, programing, or a combination thereof, for a determination and reporting of UE position in an NTN. In certain embodiments, and one or more of the gNBs 101-103 includes circuitry, programing, or a combination thereof, for a determination and reporting of UE position in an NTN.

Although FIG. 1 illustrates one example of a wireless network, various changes may be made to FIG. 1. For example, the wireless network could include any number of gNBs and any number of UEs in any suitable arrangement. Also, the gNB 101 could communicate directly with any number of UEs and provide those UEs with wireless broadband access to the network 130. Similarly, each gNB 102-103 could communicate directly with the network 130 and provide UEs with direct wireless broadband access to the network 130. Further, the gNBs 101, 102, and/or 103 could provide access to other or additional external networks, such as external telephone networks or other types of data networks.

FIG. 2 illustrates an example gNB 102 according to embodiments of the present disclosure. The embodiment of the gNB 102 illustrated in FIG. 2 is for illustration only, and the gNBs 101 and 103 of FIG. 1 could have the same or similar configuration. However, gNBs come in a wide variety of configurations, and FIG. 2 does not limit the scope of this disclosure to any particular implementation of a gNB.

As shown in FIG. 2, the gNB 102 includes multiple antennas 205a-205n, multiple RF transceivers 210a-210n, transmit (TX) processing circuitry 215, and receive (RX) processing circuitry 220. The gNB 102 also includes a controller/processor 225, a memory 230, and a backhaul or network interface 235.

The RF transceivers 210a-210n receive, from the antennas 205a-205n, incoming RF signals, such as signals transmitted by UEs in the network 100. The RF transceivers 210a-210n down-convert the incoming RF signals to generate IF or baseband signals. The IF or baseband signals are sent to the RX processing circuitry 220, which generates processed baseband signals by filtering, decoding, and/or digitizing the baseband or IF signals. The RX processing circuitry 220 transmits the processed baseband signals to the controller/processor 225 for further processing.

The TX processing circuitry 215 receives analog or digital data (such as voice data, web data, e-mail, or interactive video game data) from the controller/processor 225. The TX processing circuitry 215 encodes, multiplexes, and/or digitizes the outgoing baseband data to generate processed baseband or IF signals. The RF transceivers 210a-210n receive the outgoing processed baseband or IF signals from the TX processing circuitry 215 and up-converts the baseband or IF signals to RF signals that are transmitted via the antennas 205a-205n.

The controller/processor 225 can include one or more processors or other processing devices that control the overall operation of the gNB 102. For example, the controller/processor 225 could control the reception of UL channel signals and the transmission of DL channel signals by the RF transceivers 210a-210n, the RX processing circuitry 220, and the TX processing circuitry 215 in accordance with well-known principles. The controller/processor 225 could support additional functions as well, such as more advanced wireless communication functions. For instance, the controller/processor 225 could support beam forming or directional routing operations in which outgoing/incoming signals from/to multiple antennas 205a-205n are weighted differently to effectively steer the outgoing signals in a desired direction. Any of a wide variety of other functions could be supported in the gNB 102 by the controller/processor 225.

The controller/processor 225 is also capable of executing programs and other processes resident in the memory 230, such as an OS. The controller/processor 225 can move data into or out of the memory 230 as required by an executing process.

The controller/processor 225 is also coupled to the backhaul or network interface 235. The backhaul or network interface 235 allows the gNB 102 to communicate with other devices or systems over a backhaul connection or over a network. The interface 235 could support communications over any suitable wired or wireless connection(s). For example, when the gNB 102 is implemented as part of a cellular communication system (such as one supporting 5G/NR, LTE, or LTE-A), the interface 235 could allow the gNB 102 to communicate with other gNBs over a wired or wireless backhaul connection. When the gNB 102 is implemented as an access point, the interface 235 could allow the gNB 102 to communicate over a wired or wireless local area network or over a wired or wireless connection to a larger network (such as the Internet). The interface 235 includes any suitable structure supporting communications over a wired or wireless connection, such as an Ethernet or RF transceiver.

The memory 230 is coupled to the controller/processor 225. Part of the memory 230 could include a RAM, and another part of the memory 230 could include a Flash memory or other ROM.

Although FIG. 2 illustrates one example of gNB 102, various changes may be made to FIG. 2. For example, the gNB 102 could include any number of each component shown in FIG. 2. As a particular example, an access point could include a number of interfaces 235, and the controller/processor 225 could support a determination and reporting of UE position in an NTN. As another particular example, while shown as including a single instance of TX processing circuitry 215 and a single instance of RX processing circuitry 220, the gNB 102 could include multiple instances of each (such as one per RF transceiver). Also, various components in FIG. 2 could be combined, further subdivided, or omitted and additional components could be added according to particular needs.

FIG. 3 illustrates an example UE 116 according to embodiments of the present disclosure. The embodiment of the UE 116 illustrated in FIG. 3 is for illustration only, and the UEs 111-115 of FIG. 1 could have the same or similar configuration. However, UEs come in a wide variety of configurations, and FIG. 3 does not limit the scope of this disclosure to any particular implementation of a UE.

As shown in FIG. 3, the UE 116 includes an antenna 305, a radio frequency (RF) transceiver 310, TX processing circuitry 315, a microphone 320, and receive (RX) processing circuitry 325. The UE 116 also includes a speaker 330, a processor 340, an input/output (I/O) interface (IF) 345, a touchscreen 350, a display 355, and a memory 360. The memory 360 includes an operating system (OS) 361 and one or more applications 362.

The RF transceiver 310 receives, from the antenna 305, an incoming RF signal transmitted by a gNB of the network 100. The RF transceiver 310 down-converts the incoming RF signal to generate an intermediate frequency (IF) or baseband signal. The IF or baseband signal is sent to the RX processing circuitry 325, which generates a processed baseband signal by filtering, decoding, and/or digitizing the baseband or IF signal. The RX processing circuitry 325 transmits the processed baseband signal to the speaker 330 (such as for voice data) or to the processor 340 for further processing (such as for web browsing data).

The TX processing circuitry 315 receives analog or digital voice data from the microphone 320 or other outgoing baseband data (such as web data, e-mail, or interactive video game data) from the processor 340. The TX processing circuitry 315 encodes, multiplexes, and/or digitizes the outgoing baseband data to generate a processed baseband or IF signal. The RF transceiver 310 receives the outgoing processed baseband or IF signal from the TX processing circuitry 315 and up-converts the baseband or IF signal to an RF signal that is transmitted via the antenna 305.

The processor 340 can include one or more processors or other processing devices and execute the OS 361 stored in the memory 360 in order to control the overall operation of the UE 116. For example, the processor 340 could control the reception of DL channel signals and the transmission of UL channel signals by the RF transceiver 310, the RX processing circuitry 325, and the TX processing circuitry 315 in accordance with well-known principles. In some embodiments, the processor 340 includes at least one microprocessor or microcontroller.

The processor 340 is also capable of executing other processes and programs resident in the memory 360, such as processes for a determination and reporting of UE position in an NTN. The processor 340 can move data into or out of the memory 360 as required by an executing process. In some embodiments, the processor 340 is configured to execute the applications 362 based on the OS 361 or in response to signals received from gNBs or an operator. The processor 340 is also coupled to the I/O interface 345, which provides the UE 116 with the ability to connect to other devices, such as laptop computers and handheld computers. The I/O interface 345 is the communication path between these accessories and the processor 340.

The processor 340 is also coupled to the touchscreen 350 and the display 355. The operator of the UE 116 can use the touchscreen 350 to enter data into the UE 116. The display 355 may be a liquid crystal display, light emitting diode display, or other display capable of rendering text and/or at least limited graphics, such as from web sites.

The memory 360 is coupled to the processor 340. Part of the memory 360 could include a random access memory (RAM), and another part of the memory 360 could include a Flash memory or other read-only memory (ROM).

Although FIG. 3 illustrates one example of UE 116, various changes may be made to FIG. 3. For example, various components in FIG. 3 could be combined, further subdivided, or omitted and additional components could be added according to particular needs. As a particular example, the processor 340 could be divided into multiple processors, such as one or more central processing units (CPUs) and one or more graphics processing units (GPUs). Also, while FIG. 3 illustrates the UE 116 configured as a mobile telephone or smartphone, UEs could be configured to operate as other types of mobile or stationary devices.

Figure 4:
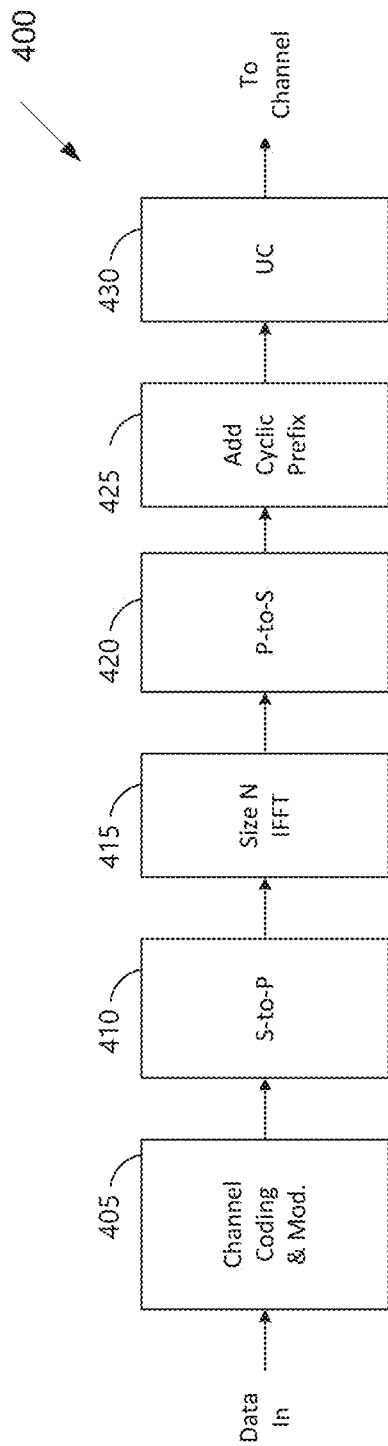
FIGS. 4 and 5 illustrate example of wireless transmit and receive paths according to this disclosure.
Figure 5:
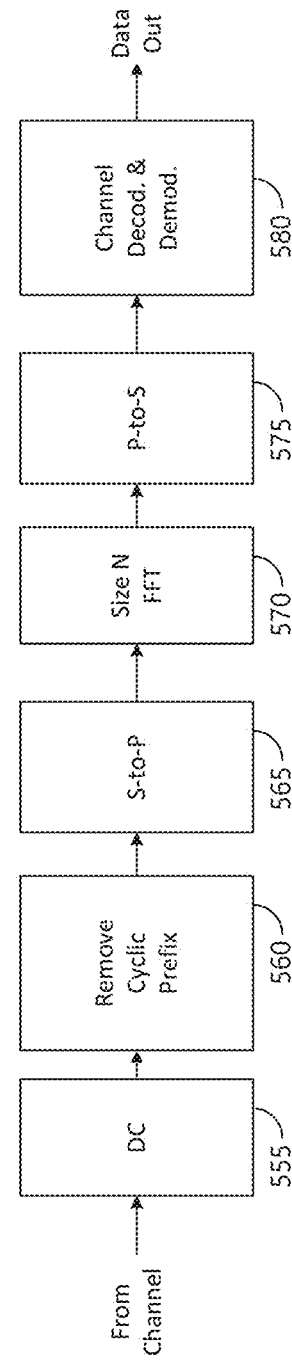

FIG. 4 and FIG. 5 illustrate example wireless transmit and receive paths according to this disclosure. In the following description, a transmit path 400 may be described as being implemented in a gNB (such as the gNB 102), while a receive path 500 may be described as being implemented in a UE (such as a UE 116). However, it may be understood that the receive path 500 can be implemented in a gNB and that the transmit path 400 can be implemented in a UE. In some embodiments, the receive path 500 is configured to support the codebook design and structure for systems having 2D antenna arrays as described in embodiments of the present disclosure.

The transmit path 400 as illustrated in FIG. 4 includes a channel coding and modulation block 405, a serial-to-parallel (S-to-P) block 410, a size N inverse fast Fourier transform (IFFT) block 415, a parallel-to-serial (P-to-S) block 420, an add cyclic prefix block 425, and an up-converter (UC) 430. The receive path 500 as illustrated in FIG. 5 includes a down-converter (DC) 555, a remove cyclic prefix block 560, a serial-to-parallel (S-to-P) block 565, a size N fast Fourier transform (FFT) block 570, a parallel-to-serial (P-to-S) block 575, and a channel decoding and demodulation block 580.

As illustrated in FIG. 4, the channel coding and modulation block 405 receives a set of information bits, applies coding (such as a low-density parity check (LDPC) coding), and modulates the input bits (such as with quadrature phase shift keying (QPSK) or quadrature amplitude modulation (QAM)) to generate a sequence of frequency-domain modulation symbols.

The serial-to-parallel block 410 converts (such as de-multiplexes) the serial modulated symbols to parallel data in order to generate N parallel symbol streams, where N is the IFFT/FFT size used in the gNB 102 and the UE 116. The size N IFFT block 415 performs an IFFT operation on the N parallel symbol streams to generate time-domain output signals. The parallel-to-serial block 420 converts (such as multiplexes) the parallel time-domain output symbols from the size N IFFT block 415 in order to generate a serial time-domain signal. The add cyclic prefix block 425 inserts a cyclic prefix to the time-domain signal. The up-converter 430 modulates (such as up-converts) the output of the add cyclic prefix block 425 to an RF frequency for transmission via a wireless channel. The signal may also be filtered at baseband before conversion to the RF frequency.

A transmitted RF signal from the gNB 102 arrives at the UE 116 after passing through the wireless channel, and reverse operations to those at the gNB 102 are performed at the UE 116.

As illustrated in FIG. 5, the down-converter 555 down-converts the received signal to a baseband frequency, and the remove cyclic prefix block 560 removes the cyclic prefix to generate a serial time-domain baseband signal. The serial-to-parallel block 565 converts the time-domain baseband signal to parallel time domain signals. The size N FFT block 570 performs an FFT algorithm to generate N parallel frequency-domain signals. The parallel-to-serial block 575 converts the parallel frequency-domain signals to a sequence of modulated data symbols. The channel decoding and demodulation block 580 demodulates and decodes the modulated symbols to recover the original input data stream.

Each of the gNB s 101-103 may implement a transmit path 400 as illustrated in FIG. 4 that is analogous to transmitting in the downlink to UEs 111-116 and may implement a receive path 500 as illustrated in FIG. 5 that is analogous to receiving in the uplink from UEs 111-116. Similarly, each of UEs 111-116 may implement the transmit path 400 for transmitting in the uplink to the gNBs 101-103 and may implement the receive path 500 for receiving in the downlink from the gNBs 101-103.

Each of the components in FIG. 4 and FIG. 5 can be implemented using only hardware or using a combination of hardware and software/firmware. As a particular example, at least some of the components in FIG. 4 and FIG. 5 may be implemented in software, while other components may be implemented by configurable hardware or a mixture of software and configurable hardware. For instance, the FFT block 570 and the IFFT block 515 may be implemented as configurable software algorithms, where the value of size N may be modified according to the implementation.

Furthermore, although described as using FFT and IFFT, this is by way of illustration only and may not be construed to limit the scope of this disclosure. Other types of transforms, such as discrete Fourier transform (DFT) and inverse discrete Fourier transform (IDFT) functions, can be used. It may be appreciated that the value of the variable N may be any integer number (such as 1, 2, 3, 4, or the like) for DFT and IDFT functions, while the value of the variable N may be any integer number that is a power of two (such as 1, 2, 4, 8, 16, or the like) for FFT and IFFT functions.

Although FIG. 4 and FIG. 5 illustrate examples of wireless transmit and receive paths, various changes may be made to FIG. 4 and FIG. 5. For example, various components in FIG. 4 and FIG. 5 can be combined, further subdivided, or omitted and additional components can be added according to particular needs. Also, FIG. 4 and FIG. 5 are meant to illustrate examples of the types of transmit and receive paths that can be used in a wireless network. Any other suitable architectures can be used to support wireless communications in a wireless network.

To meet the demand for wireless data traffic having increased since deployment of 4G communication systems and to enable various vertical applications, 5G/NR communication systems have been developed and are currently being deployed. The 5G/NR communication system is considered to be implemented in higher frequency (mmWave) bands, e.g., 28 GHz or 60 GHz bands, so as to accomplish higher data rates or in lower frequency bands, such as 6 GHz, to enable robust coverage and mobility support. To decrease propagation loss of the radio waves and increase the transmission distance, the beamforming, massive multiple-input multiple-output (MIMO), full dimensional MIMO (FD-MIMO), array antenna, an analog beam forming, large scale antenna techniques are discussed in 5G/NR communication systems.

In addition, in 5G/NR communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancelation and the like.

The discussion of 5G systems and frequency bands associated therewith is for reference as certain embodiments of the present disclosure may be implemented in 5G systems. However, the present disclosure is not limited to 5G systems or the frequency bands associated therewith, and embodiments of the present disclosure may be utilized in connection with any frequency band. For example, aspects of the present disclosure may also be applied to deployment of 5G communication systems, 6G or even later releases which may use terahertz (THz) bands.

There are several use cases for using the UE position in an NTN such as identifying the UE location in a cell, estimating the UE-platform/UE-NTN-GW/UE-gNB distance, estimating timing advance, determining a synchronization signal/physical broadcast channel (SS/PBCH) block measurement timing configuration (SMTC) configuration, determining associated virtual cell(s), determining earth-fixed tracking area, enhancing the scheduling, facilitating cell selection/reselection, and facilitating handover.

However, if the UE needs to continuously determine its GNSS-based position, it may drain the UE battery life. At the other extreme, if there is a long gap between the instants when the UE determines its GNSS-based position, it would affect the accuracy of the UE position that is known to the network, adversely affecting various operations mentioned above. Furthermore, if the UE position is reported too frequently, it would significantly increase the amount of signaling and required increased processing at the UE and in the network. Additionally, depending upon the use case, an RRC signaling may be too slow and a lower layer reporting may be more effective.

As of Release 16 of 3GPP, there are no mechanisms in place for the UE to frequently report its position to the network except in support of self-organizing network/minimization of driving test (SON/MDT). This disclosure introduces enhancements in the areas such as: (i) when the UE determines its UE position, (ii) the conditions under which the UE reports its positon, (iii) formats of reporting of the UE position, and (iv) signaling used by the UE to report its position.

Figure 6:
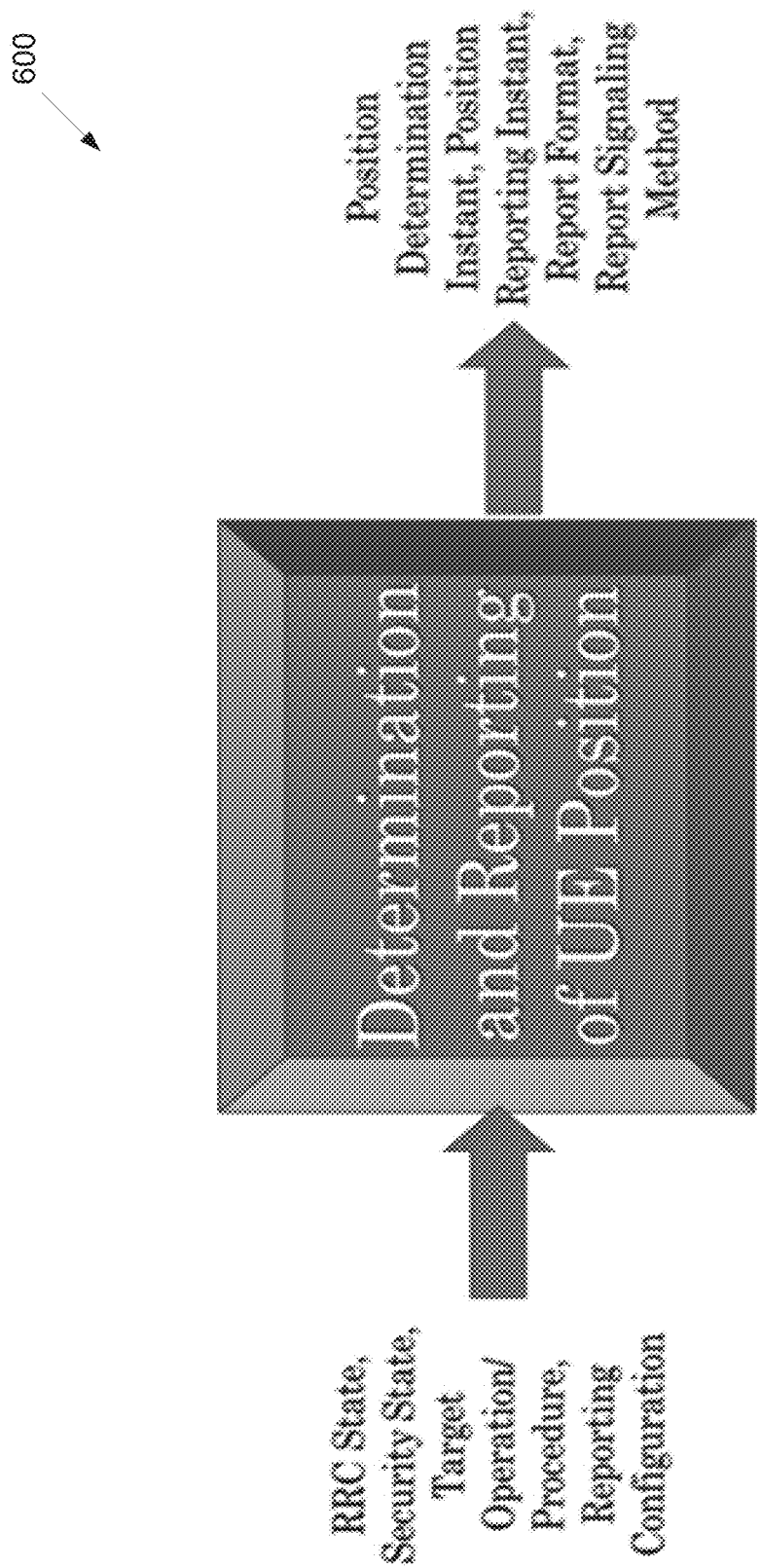
FIG. 6 illustrate an example of UE position determination and UE position reporting according to embodiments of the present disclosure.

FIG. 6 illustrate an example of UE position determination and UE position reporting 600 according to embodiments of the present disclosure. An embodiment of the UE position determination and UE position reporting 600 shown in FIG. 6 is for illustration only.

FIG. 6 summarizes the overall mechanism of the UE position determination and reporting in support of various operations in an NTN.

AS illustrated in FIG. 6, the UE considers factors such as RRC state, security state, target operation/procedure, and reporting configuration to determine when to determine its position by observing the global navigation satellite system (GNSS) such as global positioning system (GPS) satellites. The NR RRC State may be RRC_CONNECTED, RRC_IDLE, or RRC_INACTIVE. The security State may be "security activated" or "security not activated."

Example procedures for the UE position usage include timing advance determination, SMTC and measurement gap configuration determination, tracking area management, scheduling, cell selection/reselection, and handover.

Depending upon the use case or procedure, the UE provides its latest recorded GNSS-based position (and optionally velocity and time) to the gNB via RRC, MAC, or PHY signaling and the access and mobility management function (AMF) via NAS signaling in different embodiments of the present disclosure. The format of the UE position may be such that the UE reports its full coordinates or incremental coordinates in different embodiments of the present disclosure.

Figure 7:
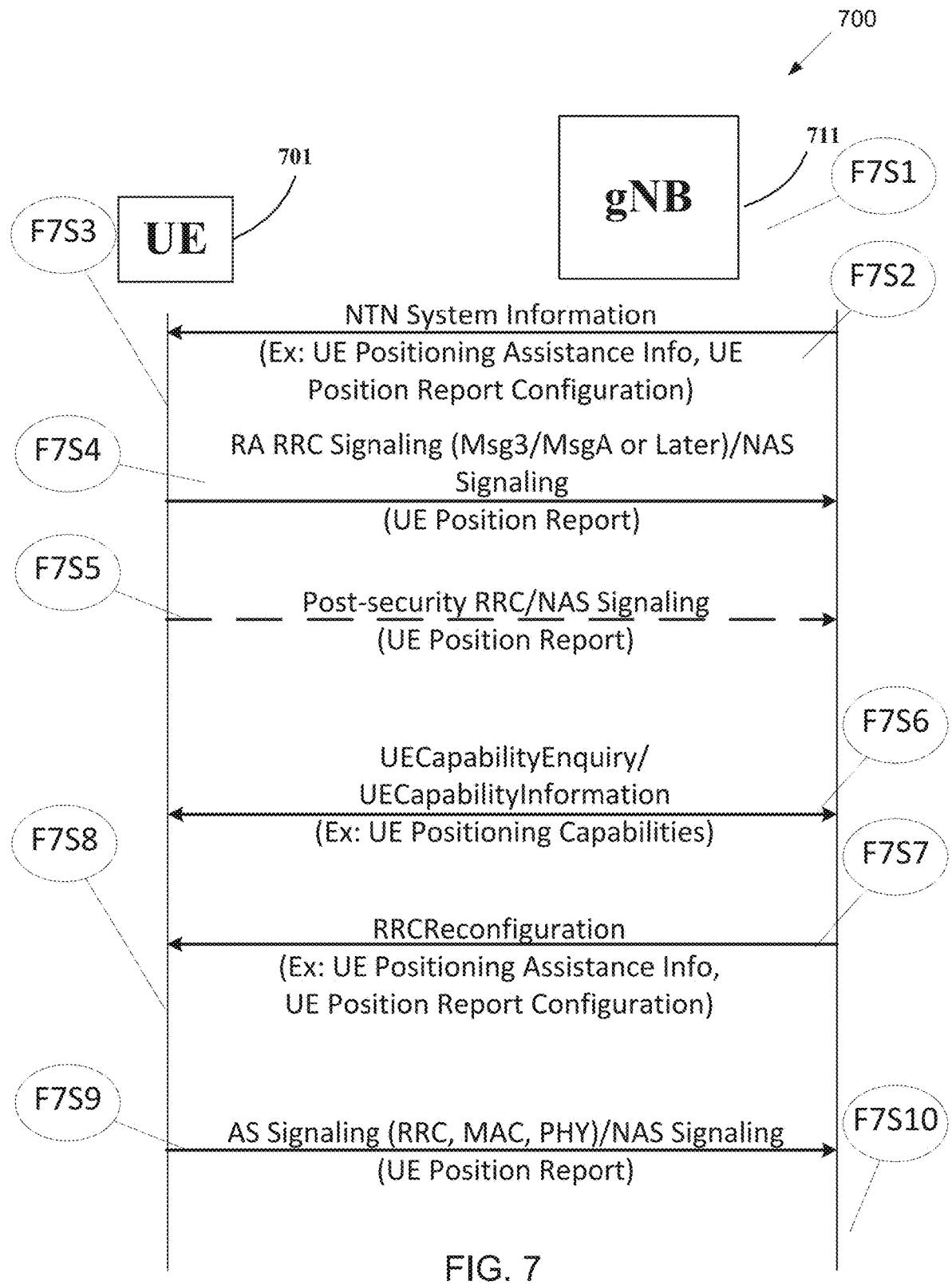
FIG. 7 illustrate a signaling flow for a UE-network procedure for a UE position determination and a UE position reporting according to embodiments of the present disclosure.

FIG. 7 illustrate a signaling flow for a UE-network procedure 700 for a UE position determination and a UE position reporting according to embodiments of the present disclosure. The UE-network procedure 700 as may be performed by a UE (e.g., 111-116 as illustrated in FIG. 1) and a BS (e.g., 101-103 as illustrated in FIG. 1). An embodiment of the UE-network procedure 700 shown in FIG. 7 is for illustration only. One or more of the components illustrated in FIG. 7 can be implemented in specialized circuitry configured to perform the noted functions or one or more of the components can be implemented by one or more processors executing instructions to perform the noted functions.

FIG. 7 shows the overall UE-network signaling procedure to illustrate example embodiments of the present disclosure to enable the UE to decide when to determine its GNSS-based position and convey its GNSS-based position to the network using suitable format(s) and signaling mechanism (S).

As illustrated in FIG. 7, in Step F7S1, in an example, the gNB determines the assistance information to facilitate UEs in RRC_IDLE and RRC_INACTIVE states and possibly UEs in RRC_CONNECTED state to determine their GNSS-based position determination. The gNB also determines the configuration for the UE's position reporting in an embodiment of the present disclosure in an explicit example. In such explicit example, the gNB may determine the periodicity with which the UE needs to observe the GNSS and determine its position.

In one example, the gNB decides the periodicity of the position determination at the UE as a function of the RRC state. For example, the gNB determines one periodicity value (e.g., A ms) for the RRC_IDLE devices, another periodicity value (e.g., B ms) for the RRC_INACTIVE devices, and yet another periodicity value (e.g., C ms) for the RRC_CONNECTED devices. While in one example, A, B, and C can be the same, they all can be different in another example. In a specific example, C is smaller than A (and smaller than B) so that the UE does not need to continuously or frequently determine the GNSS-based position by observing the GNSS continuously or frequently in RRC_IDLE and RRC_INACTIVE mode. Such different values of periodicity save the UE processing power and increases the UE battery life in IDLE and INACTIVE modes while providing more accurate position in CONNECTED state.

In another embodiment in Step F7S1, the periodicity of the GNSS-based position determination is specified in the specifications as part of performance requirements instead of explicit broadcast of such periodicity in the System Information.

In an embodiment of the present disclosure, the gNB determines parameters such as positionReportingDistanceThreshold and positionReportingTimeThreshold (or positionReportingTimer). After the UE has conveyed its position to the network (e.g., the gNB) at an earlier instant, the UE reports to the network its new position again if it has traveled a distance greater than positionReportingDistanceThreshold. In an embodiment of the present disclosure, after the UE has conveyed its position to the network (e.g., the gNB), the UE reports to the network its new position again if a time elapsed since the last report exceeds positionReportingTimeThreshold, or an equivalent timer value of positionReportingTimer.

The gNB conveys the position reporting parameters in a system information block (SIB) in one example in Step F7S2. In another example, the gNB conveys these parameters via dedicated signaling messages such as RRC reconfiguration in Step F7S7.

In an example embodiment of the present disclosure, the gNB receives from a network function unsecured positioning reference point (UPRP) position coordinates such that the UE and the network have the same common positioning reference. In an example, the network function (NF) is the operation, administration and management (OAM) system. In another example, the NF is the home subscriber server (HSS) and the information is conveyed from the HSS to the gNB via a series of intra-network signaling messages.

The UPRP position coordinates enable the UE to send transformed position coordinates to the network (e.g., gNB or AMF) even when security has not been activated. For example, transformed coordinates may be (X', Y', Z') instead of the actual coordinates (X, Y, Z) by using a mathematical relationship such as Eq. (1). Different math operators can be used (e.g., − instead of + and scaling factors):

$$X'=X-Xuprp, Y'=Y-Yuprp, \text{ and } Z'=Z-Zuprp, \quad (1)$$

In Eq. (1), Xuprp, Yuprp, and Zuprp can have the same or different values.

Secured positioning reference point (SPRP) position coordinates enable the UE to send incremental position coordinates to the network (e.g., gNB or AMF) even when security has been activated. For example, incremental coordinates may be (X'', Y'', Z'') instead of the actual coordinates (X, Y, Z) by using a mathematical relationship such as Eq. (2). Different math operators can be used (e.g., − instead of + and scaling factors):

$$X''=X-Xuprp, Y'=Y-Yuprp, \text{ and } Z'=Z-Zuprp, \quad (2)$$

In Eq. (2), Xsprp, Ysprp, and Zsprp can have the same or different values.

In Step F7S1, the gNB may decide to choose only position coordinates to be part of the UE position report in one example. In another example, position coordinates and velocities are included. In yet another example, position, velocity, and time are included. In another example, different combinations of position, velocity, and time are chosen to be part of the position report depending upon the use case or the procedure.

In another example, different signaling mechanisms convey different standalone or combinations of the quantities—position, velocity, and time. Furthermore, like position coordinates, velocities and times may be absolute or incremental or relative. In case of relative values, reference values are broadcast via system information that is transmitted via a UE dedicated RRC message by the network or determined by a pre-configuration or based on a fixed rule in one example. In another example, full or absolute values are specified less frequently by the UE (e.g., via an RRC signaling, a pre-configuration, or a fixed rule) and incremental or relative values are conveyed thereafter.

In Step F7S1, in an example, the UE receives the UPRP coordinates from an NF. Such NF is an OAM system in one example and an application server in another example.

In Step F7S2, the gNB broadcasts the UE positioning assistance information such as SPRP coordinates and positioning report configuration (e.g., periodicity for position determination and coordinates format). In one example, the UE position determination and reporting information is provided by the gNB by adding a new IE in an existing SIB. In one example, the UE position determination and reporting information are provided by the gNB by adding a new IE in an NTN-specific SIB. In yet another example, the UE position determination and reporting information may be specified in different SIBs.

In Step F7S3, the UE applies the position determination and reporting configuration based on the received SIB(s) in one example. In another example, the UE utilizes the position determination and reporting configuration per specifications (i.e., without using a SIB for such configuration).

In Step F7S4, when the UE needs to carry out a random access (RA) procedure, the UE considers the state of the security to determine whether to send position coordinates to the network or not in one example. In another example, the UE considers the state of the security to determine whether to send original position coordinates to the network or transformed coordinates. In an example, the UE sends actual absolute or incremental position coordinates to the network (e.g., the gNB) if the security has been activated. In another example, the UE sends transformed coordinates to the network (e.g., the gNB) if the security has not been activated.

In Step F7S4, if the gNB has provided adequate UL resources, the UE includes the position along with msgA in case of the 2-step RA procedure and along with msg3 in case of the 4-step RA procedure. In one example, a new "UE position" IE is added to existing RRC messages (e.g., RRC setup request, RRC reconfiguration complete, RRC resume request, or RRC reestablishment request). In another example, a new "UE position" MAC control element (CE) is used to convey the UE position.

In Step F7S4, if the UE position cannot be conveyed to the gNB by the UE in msgA due to reasons such as inadequate UL resource availability, the UE includes the position with an RRC message or a MAC CE, possibly with any UL traffic (including user data) after sending msgA in case of the 2-step RA procedure and after sending msg3 in case of the 4-step RA procedure (e.g., msg5 or later) when adequate UL resources are available to accommodate the UE position report. Such UE position report placement may be considered to be "padding UE position report," where the UE position MAC CE is included when there is space left after including the target RRC message.

In one example, the UE position MAC CE is prioritized comparing to other MAC CEs such as the buffer status report (BSR) CE. In another example, the UE position MAC CE is deprioritized comparing to other MAC CEs such as the BSR CE.

In Step F7S4, when the UE sends a NAS message such as a registration request message, the UE considers the state of the security. In an example, the UE sends actual absolute or incremental position coordinates to the AMF if the security has been activated. In another example, the UE sends transformed coordinates to the AMF if the security has not been activated.

In case the security has not been activated when the UE sends a NAS message such as registration request, the UE sends the position to the AMF after security has been activated. In such case, the UE sends an RRC UL information transfer message carrying a NAS UL transport message conveying the UE position report.

In Step F7S6, the gNB and the UE exchange UECapabilityEnquiry and UECapabilityInformation messages. The UE conveys its position capabilities such as a class associated with the periodicity of GNSS-based measurements. One class may correspond to a shorter interval between two GNSS-based position determinations and another class may correspond to a longer interval between two GNSS-based position determinations.

In Step F7S7, the gNB may specify UE-specific position determination and reporting configuration to the UE and can thus supersede any default or SIB-based configuration.

In Step F7S8, the UE considers dedicated signaling to determine the periodicity of position determination and reporting configuration.

In Step F7S9, the UE provides the position report to the gNB via access stratum (AS) signaling and to the AMF via the non-access stratum (NAS) signaling. In one example, RRC signaling is used to convey the UE position report. In another example, a MAC CE is used to convey the UE position report.

In Step F7S10, the gNB conveys the virtual cell identity or the tracking area identification (TA ID) to the AMF based on the UE-reported position coordinates.

Figure 8A:
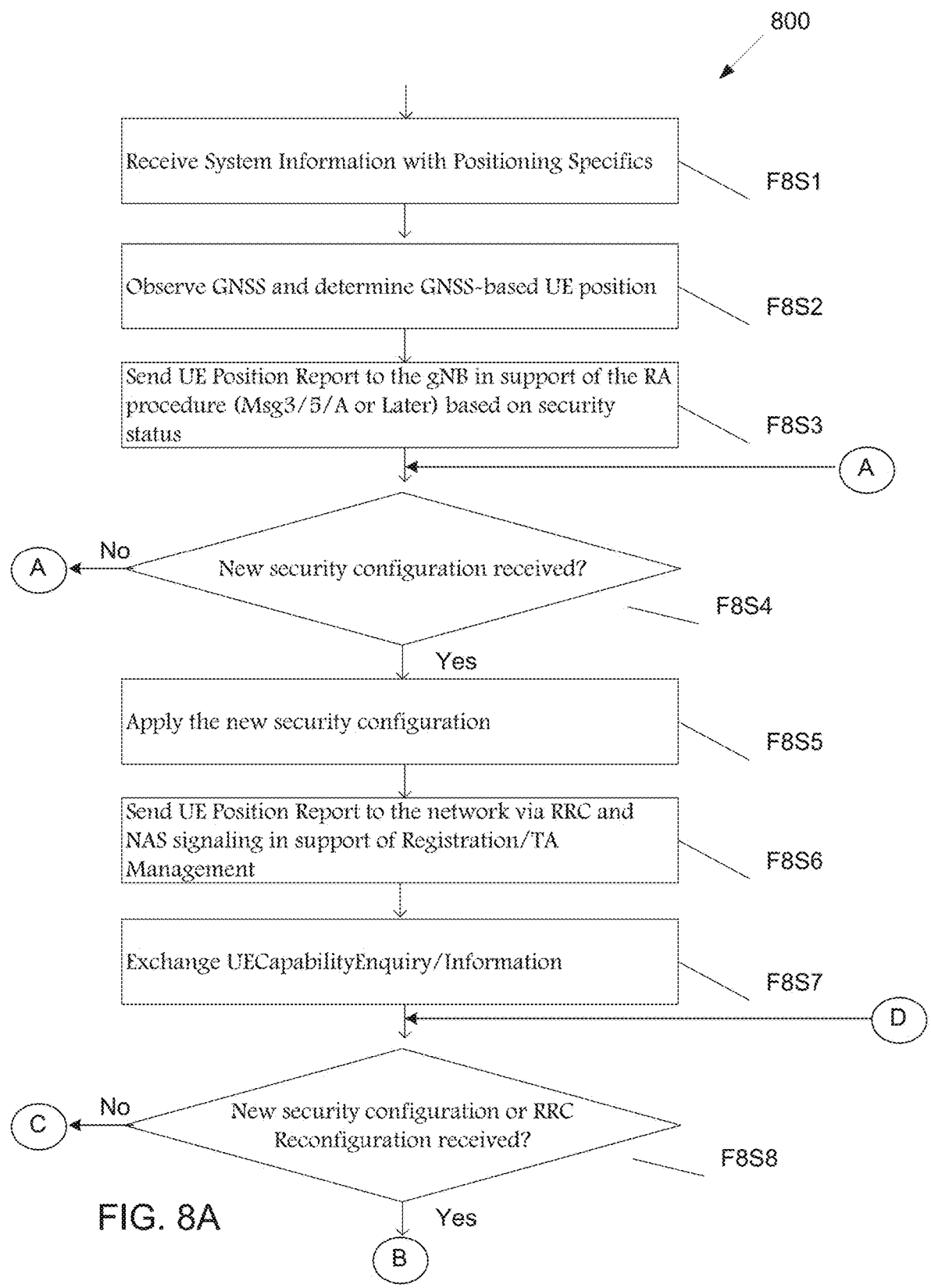
FIG. 8A illustrates a flowchart of a UE procedure for a UE position determination and a UE position reporting according to embodiments of the present disclosure.

FIG. 8A illustrates a flowchart of a UE procedure 800 for a UE position determination and a UE position reporting according to embodiments of the present disclosure. The UE procedure 800 as may be performed by a UE (e.g., 111-116 as illustrated in FIG. 1). An embodiment of the UE procedure 800 shown in FIG. 8A is for illustration only. One or more of the components illustrated in FIG. 8A can be implemented in specialized circuitry configured to perform the noted functions or one or more of the components can be implemented by one or more processors executing instructions to perform the noted functions.

Figure 8B:
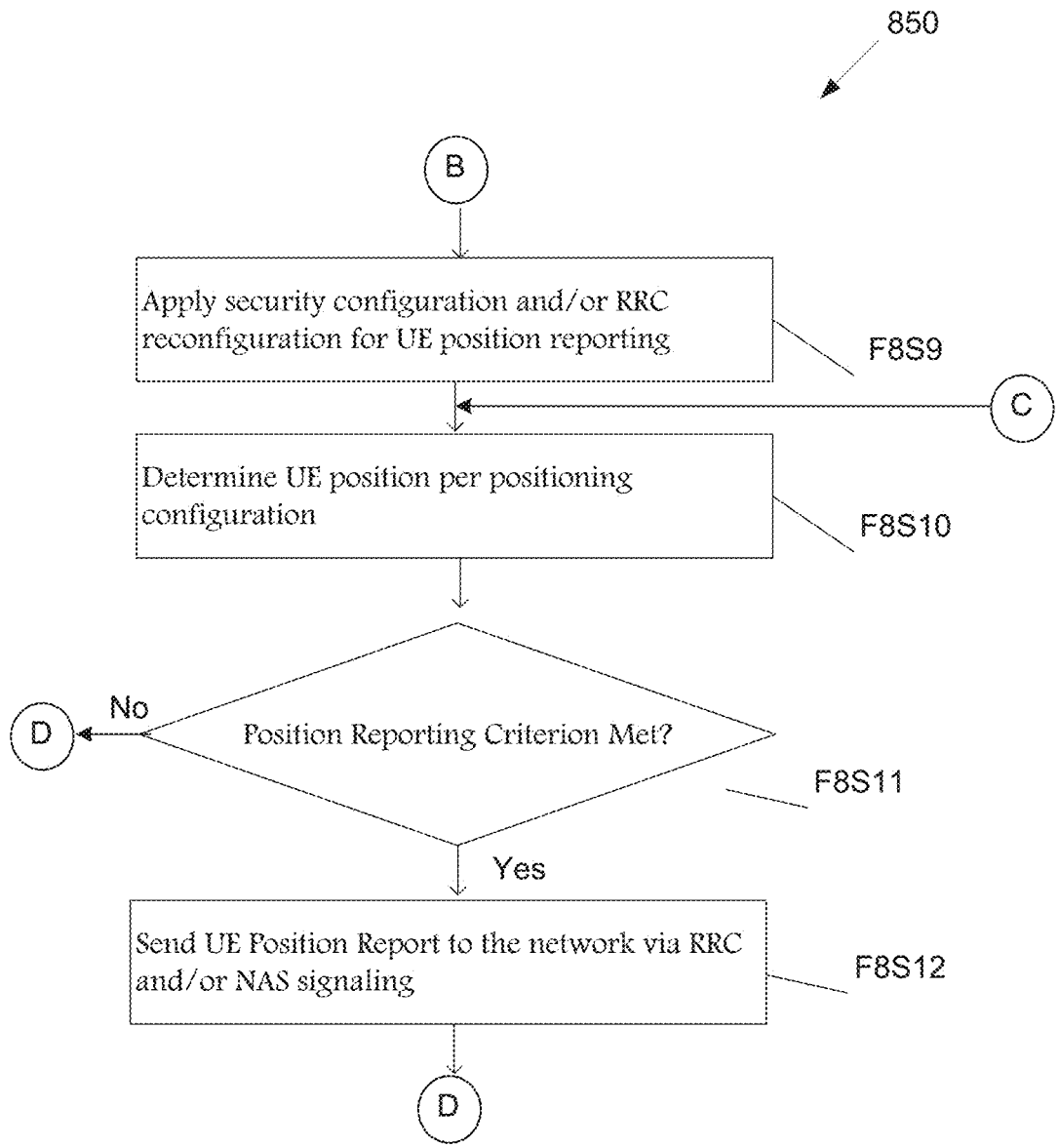
FIG. 8B illustrates a flowchart of a UE procedure for a UE position determination and a UE position reporting according to embodiments of the present disclosure.

FIG. 8B illustrates a flowchart of a UE procedure 850 for a UE position determination and a UE position reporting according to embodiments of the present disclosure. The UE procedure 850 as may be performed by a UE (e.g., 111-116 as illustrated in FIG. 1). An embodiment of the UE procedure 850 shown in FIG. 8B is for illustration only. One or more of the components illustrated in FIG. 8B can be implemented in specialized circuitry configured to perform the noted functions or one or more of the components can be implemented by one or more processors executing instructions to perform the noted functions.

FIG. 8A and FIG. 8B show the overall UE procedure to illustrate example embodiments of the present disclosure to enable the UE to determine the UE position and convey the UE position to the gNB.

In Step F8S1, the UE receives system information with positioning specifics from the gNB in the form of new IE(s) in an existing SIB, new NTN SIB(s), or a combination of SIB(s).

In Step F8S2, the UE observes the GNSS and determines its GNSS-based UE position.

In Step F8S3, the UE sends the position report to the gNB in support of the RA procedure (Msg3/5/A or Later) based on security status as illustrated in FIG. 7 (e.g., Step F7S1). The UE position report includes absolute coordinates, incremental or relative coordinates, or transformed coordinates as described in Step F7S1.

In Step F8S4, the UE checks if the UE has received a new security configuration. If the Ue has, the UE goes to Step F8S5. Otherwise, the UE waits for this configuration to arrive from the gNB (e.g., in the form of security mode command message).

In Step F8S5, the UE applies the new security configuration such as integrity protection and ciphering.

In Step F8S6, the UE sends the position report to the network via RRC and NAS signaling in support of registration/TA management. The UE position report includes absolute coordinates, incremental or relative coordinates, or transformed coordinates as described in Step F7S1 as illustrated in FIG. 7.

In Step F8S7, the UE and the gNB exchange UE capability enquiry and UE capability information.

In Step F8S8, the UE checks if new security configuration has been received or an RRC reconfiguration message has been received. If it has, the UE goes to Step F8S9. If not, the UE goes to Step F8S10.

In Step F8S9, the UE applies the security configuration if received. Furthermore, the UE applies the position determination and position reporting configuration if received in an RRC reconfiguration message.

In Step F8S10, the UE follows the configuration to determine how frequently to determine its GNSS-based position.

In Step F8S11, the UE checks if a position reporting event has occurred. If the UE has, goes to Step F8S12. If not, the UE goes to Step F8S8. Examples of positioning events include the need to determine the timing advance determination, the need to use SMTC and measurement gap configuration to search for neighbor cells, the need to send a registration request message in support of tracking area management or registration area management due to periodic registrations or mobility-based registrations, scheduling, the need for cell selection/reselection, and the need for handover, and need for rule-based reporting.

In an embodiment of the present disclosure, after the UE has conveyed its position to the network (e.g., the gNB) at an earlier instant, the UE reports to the network its new position again if it has traveled a distance greater than positionReportingDistanceThreshold.

In an embodiment of the present disclosure, after the UE has conveyed its position to the network (e.g., the gNB), the UE reports to the network its new position again if a time elapsed since the last report exceeds positionReportingTimeThreshold, which can also be expressed as a timer value positionReportingTimer.

In Step F8S12, the UE sends the position report to the gNB via RRC or MAC signaling and to the MME via NAS signaling. The UE position report includes absolute coordinates, incremental or relative coordinates, or transformed coordinates as illustrated in Step F7S1 of FIG. 7.

To save precious radio resources while conveying its position to the network (i.e., the gNB or a 5GC network function such as the AMF and the location management function (LMF)), the UE utilizes a compact representation of the UE location information element in an embodiment of the present disclosure.

In an example, the UE utilizes a compact UE location IE in messages shown in Steps F7S4, F7S5, F7S9, F8S3, F8S6, and F8S12 in FIG. 7 and FIG. 8.

In an example embodiment of the present disclosure, the UE utilizes an existing IE called "commonLocationInformation" to convey its position to the network. In another example, the UE includes a compact version of the "commonLocationInformation" IE by excluding one or multiple of the following IEs: locationError-r16, locationSource-r16, and velocityEstimate-r16.

In another example, only locationTimestamp-r16 and locationCoordinate-r16 are included in the compact IE "commonLocationInformationCompact" or "compactCommonLocationInformation" as part of the UE's position report.

In yet another example, the UE includes such position information when its confidence about the accuracy of such information exceeds a threshold (which can be specified as part of the position reporting configuration via an RRC Reconfiguration message or defined in specifications).

In another example, velocityEstimate-r16 is excluded and other fields of "commonLocationInformation" are included or preserved to create "commonLocationInformationCompact," "compactCommonLocationInformation," or an equivalent IE.

In an example, incremental times are reported in the position reports to reduce the overall size of the report.

In another example, incremental UE positions are reported in the position reports to reduce the overall size of the report.

An NTN has unique challenges such as long propagation delays compared to a terrestrial network (TN). Hence, hybrid automatic repeat request (HARQ) management for the DL transmissions and the UL transmissions requires enhancements in an NTN relative to a TN.

In particular, mechanisms are needed to support blind retransmissions and enabling/disabling of HARQ feedback. For example, the gNB may not want to use HARQ feedback for DL and/or UL transmissions and use blind retransmissions instead to avoid the long round trip time (RTT) or round trip propagation delays inherent in HARQ feedback.

In particular, when relatively more radio resources are available in a given target slot, the gNB can make use of blind retransmissions. Additionally, the UE needs to know the characteristics of a given type of HARQ process to carry out proper logical channel prioritization (LCP).

The present disclosure introduces enhancements in the areas such as: (i) flexible configuration of HARQ processes for regular and blind retransmissions and (ii) re-purposing existing downlink control information (DCI) bits for an NTN to support different types of HARQ retransmissions.

Figure 9:
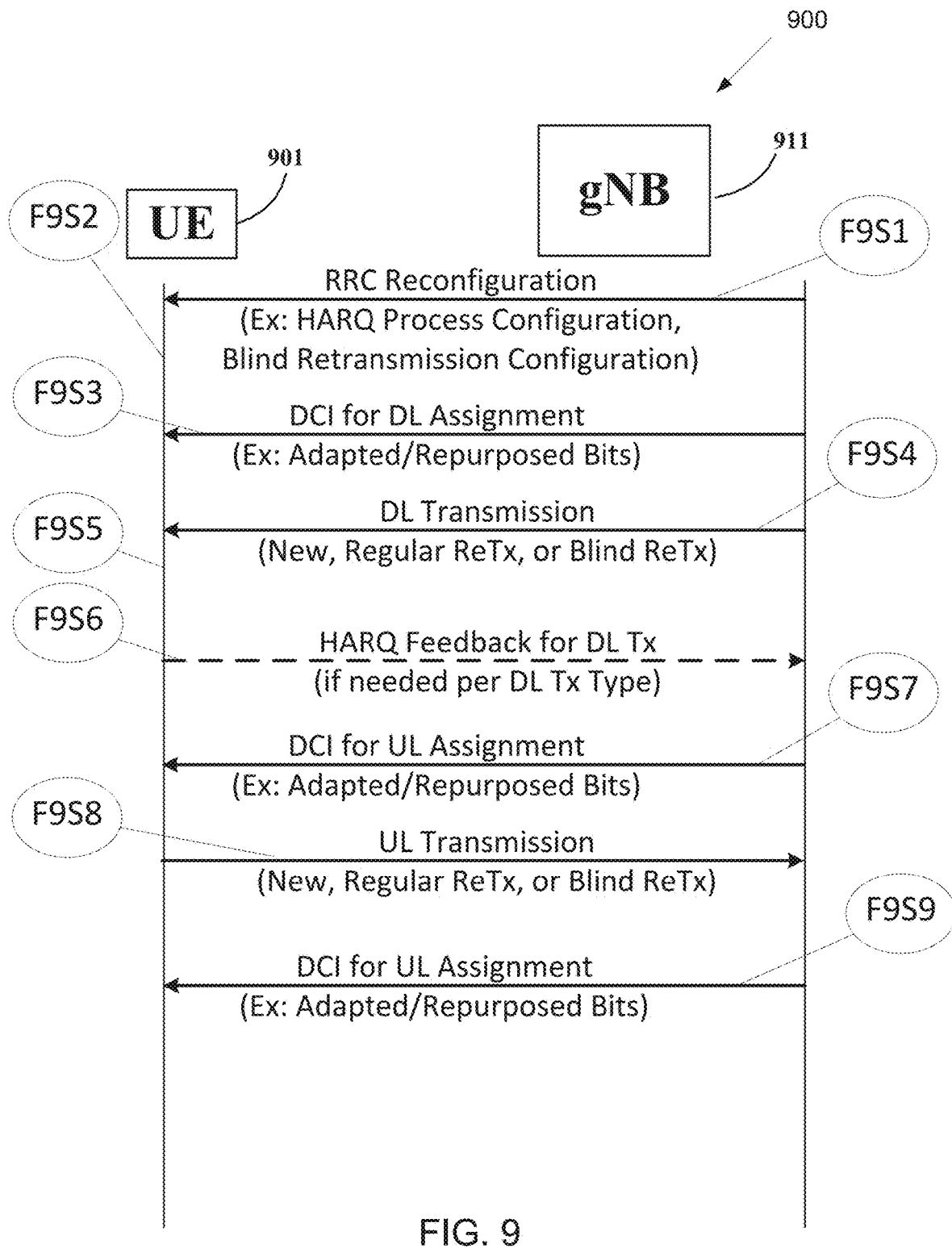
FIG. 9 illustrate a signaling flow for a UE-network procedure for HARQ management according to embodiments of the present disclosure.

In FIG. 9, the UE considers factors such as DCI, available information for transmission (e.g., RRC signaling, MAC CEs, and user traffic), HARQ process configuration, and blind retransmission configuration to determine what information to transmission in the uplink and what processing to prepare for in case of the received DL assignment based on the retransmission type.

In an embodiment of the present disclosure, existing DCI bits are re-purposed to manage HARQ operations such as supporting blind retransmissions and LCP at the UE (and the gNB).

Selected timers may also be re-purposed to support different types of HARQ retransmissions in another embodiment of the present disclosure.

FIG. 9 illustrate a signaling flow for a UE-network procedure 900 for HARQ management according to embodiments of the present disclosure. The UE-network procedure 900 as may be performed by a UE (e.g., 111-116 as illustrated in FIG. 1) and a BS (e.g., 101-103 as illustrated in FIG. 1). An embodiment of the UE-network procedure 900 shown in FIG. 9 is for illustration only. One or more of the components illustrated in FIG. 9 can be implemented in specialized circuitry configured to perform the noted functions or one or more of the components can be implemented by one or more processors executing instructions to perform the noted functions.

FIG. 9 shows the overall UE-network signaling procedure to illustrate example embodiments of the present disclosure in support of different types of HARQ retransmissions for the DL and the UL.

As illustrated in FIG. 9, in Step F9S1, in an embodiment of the present disclosure, the gNB sends an RRC reconfiguration message and specifies HARQ process configuration. In one example, the gNB specifies the HARQ process configuration for the DL transmissions. In another example, the gNB specifies the HARQ process configuration for the UL transmissions.

In an example of HARQ process configuration, the gNB specifies which HARQ processes are "HARQ feedback enabled only," "HARQ feedback disabled only," and "dynamic HARQ feedback enabled/disabled."

In an embodiment of the present disclosure, when "dynamic HARQ feedback enabled/disabled" is used for a HARQ process, the gNB can dynamically enable or disable the feedback using re-purposed DCI bits. In an example, the gNB can support blind retransmissions using re-purposed DCI bits.

In another embodiment in Step F9S1, the gNB specifies configuration in support of blind retransmissions. In one example, the configuration for the DL blind retransmissions is specified. In another example, the configuration for the UL blind retransmissions is specified.

In an embodiment of the present disclosure, when blind retransmission configuration is specified by the gNB, the gNB includes a timer "blindRetransmissionTimer" during which the gNB can expect an assignment for blind retransmissions. In one example, "blindRetransmissionTimer" is specified for the DL (i.e., blindRetransmissionTimerDL). In another example, blindRetransmissionTimer" is specified for the UL (i.e., blindRetransmissionTimerUL).

In an example, drx-RetransmissionTimerUL can be re-purposed to achieve the similar effect.

Steps F9S3 and F9S4 are described next for the DL transmissions.

In Step F9S3, the gNB specifies a DCI on the PDCCH to convey the resources for the DL assignment. In an embodiment of the present disclosure, the gNB repurposes existing DCI bits to specify enabling or disabling of HARQ feedback. In another example, the gNB repurposes existing DCI bits to support blind retransmissions.

In an example embodiment of the present disclosure, in Step F9S3, some of the "modulation and coding scheme" (MCS) bits are used to enable/disable HARQ feedback-based HARQ retransmissions and/or specify transmission configuration. In one example, reserved bits of the DCI are used to enable/disable HARQ feedback. In another example, higher values of the MCS that are not reserved bits but that correspond to high spectral efficiency. Note that challenging radio environment prohibits the use of high NCS values, enabling their re-purposing for an NTN. As an example, I_MCS of 27 associated with the spectral efficiency of 5.5547 and I_MCS of 26 associated with the spectral efficiency of 5.332, and so on can be used to convey HARQ management parameters instead of the usual MCS.

In an example embodiment of the present disclosure, in Step F9S3, some bits of "PDSCH-to-HARQ feedback timing indicator" are repurposed to convey enable/disable HARQ feedback-based HARQ retransmissions and/or specify transmission configuration. For example, some of the values (e.g., k1=1 and 2) may be used to specify such HARQ configuration.

In an embodiment of the present disclosure, in Step F9S3, the gNB utilizes repurposed DCI bits to covey enabling/disabling of HARQ feedback and/or the type of DL transmission, especially blind retransmission that does not require the HARQ feedback from the UE. Such indication about the transmission type enables the UE to skip sending of HARQ feedback on a PUCCH or PUSCH, saving the associated processing power and reduce overall interference in the UL.

In Step F9S3, in an example, the gNB repurposes DCI bits in the DCI format 1_0. In another example, the gNB repurposes DCI bits in the DCI format 1_1.

In Step F9S3, in yet another example, a new DCI format (e.g., format 1_2 or 1_X, where X is any number different from values used in specifications) is used for an NTN. Such new DCI format creates a compact DCI that is relevant to the NTN. In an example, such DCI format reduces the #of MCS bits.

In yet another example, in Step F9S3, a compact DCI for an NTN is created by the gNB by removing multiple antenna transmission related fields from the DCI format 1_1, which are not applicable to the NTN because multi-antenna transmissions are not feasible in a typical NTN.

In Step F9S4, the UE receives the DL transmission on the physical downlink shared channel (PDSCH) resources specified by the gNB in Step F9S3. This DL transmission may be a new packet transmission or a retransmission. Furthermore, the retransmission may be a regular retransmission that reflects the HARQ feedback received from the UE or a blind retransmission of a previously sent packet or a transport block.

In Step F9S5, the UE also decides the next step of processing such as sending HARQ ACK/NACK after decoding the packet if HARQ feedback has been enabled for the DL transmission or keeping an unsuccessfully decoded copy of the packet/transport block for a future retransmission or blind retransmission.

In Step F9S6, the UE sends HARQ ACK/NACK feedback when the DL assignment utilizes regular HARQ operations that requires the UE to send the HARQ feedback and when HARQ feedback has not been disabled.

In an example, in Step F9S6, if the DL assignment is for a blind retransmission, the UE utilizes the received blind retransmission configuration to prepare for the blind retransmission such as preparing to wait for blind retransmission within a time window. In another example, if the gNB has indicated a blind retransmission with the HARQ feedback disabled, the UE does not send HARQ feedback on the physical uplink control channel (PUCCH) or the physical uplink shared channel (PUSCH).

Steps F9S7 to F9S9 are described next for the UL transmissions.

In Step F9S7, the gNB specifies a DCI on the physical downlink control channel (PDCCH) to convey the resources for the UL assignment. In an embodiment of the present disclosure, the gNB repurposes existing DCI bits to specify enabling or disabling of HARQ feedback. In another example, the gNB repurposes existing DCI bits to support blind retransmissions.

In an example embodiment of the present disclosure, in Step F9S7, some of the "modulation and coding scheme" (MCS) bits are used to enable/disable HARQ feedback and/or specify transmission configuration. In one example, reserved bits of the DCI are used to convey enabling/disabling of HARQ feedback so that the UE knows that this UL assignment supports regular HARQ retransmissions or not to be able to carry out the LCP in the UL. In another example, higher values of the MCS that are not reserved bits but that correspond to high spectral efficiency. Note that challenging radio environment prohibits the use of high NCS values, enabling their re-purposing for an NTN.

In an embodiment of the present disclosure, in Step F9S7, the gNB utilizes repurposed DCI bits to covey enabling/disabling of HARQ feedback and/or the allowed type of UL transmission (e.g., transmission with the typical implicit HARQ feedback from the gNB or transmission without the typical implicit HARQ feedback from the gNB). In an example, the gNB indicates if HARQ feedback has been disabled or not for this UL assignment. Furthermore, in another example, the gNB may also indicate if the UE is expected to receive any traditional implicit HARQ feedback from the gNB for this UL transmission or not.

Such indication from the gNB enables the UE to prepare for potential future processing (e.g., whether to look for an implicit feedback or to prepare for the next blind retransmission or not).

In Step F9S7, in an example, the gNB repurposes DCI bits in the DCI format 0_0. In another example, the gNB repurposes DCI bits in the DCI format 0_1.

In Step F9S7, in yet another example, a new DCI format (e.g., format 0_2 or 0_X, where X is any number different from values used in specifications) is used for an NTN. Such new DCI format creates a compact DCI that is relevant to the NTN. In an example, such DCI format reduces the #of MCS bits.

In yet another example, in Step F9S7, a compact DCI for an NTN is created by the gNB by removing multiple antenna transmission related fields from the DCI format 1_1, which are not applicable to the NTN because multi-antenna transmissions are not feasible in a typical NTN.

In Step F9S8, the UE carries out the LCP based on the HARQ management parameters and indications (e.g., enabling/disabling of regular HARQ). The UE then sends the UL transmission on the PUSCH resources specified by the gNB in Step F9S7. This UL transmission may be a new packet transmission or a retransmission. Furthermore, the retransmission may be a regular retransmission that reflects the implicit HARQ feedback received from the gNB or a blind retransmission of a previously sent packet or a transport block.

In Step F9S8, the UE also decides the next step of processing such as preparing to receive or not receive implicit HARQ ACK/NACK for the UL transmission that it has carried out for the relevant HARQ process.

Step F9S9 is analogous to Step F9S7 and includes an implicit HARQ feedback from the gNB about the UL transmission it has received if the associated HARQ process had HARQ feedback enabled.

In an example embodiment of the present disclosure, the enabling/disabling of HARQ feedback influences the generic UE behavior related to overall processing of the received UL assignment and the information that the UE would transmit using the assignment. In another embodiment of the present disclosure, the enabling/disabling of HARQ feedback influences the UE behavior related to the timer drx-HARQ-RTT-TimerUL.

In one embodiment of generic UE behaviors, one generic UE behavior corresponds to a regular HARQ retransmission with regular HARQ feedback after the PUSCH has been decoded. Another generic UE behavior corresponds to blind HARQ retransmission without HARQ feedback after the PUSCH has been decoded. Yet another generic UE behavior corresponds to new transmission without HARQ feedback after the PUSCH has been decoded.

The gNB can set the value of drx-HARQ-RTT-TimerUL based on the type of the HARQ transmission for a given process to influence the UE behavior related to drx-HARQ-RTT-TimerUL.

In one embodiment of drx-HARQ-RTT-TimerUL related UE behaviors, one UE behavior ("behavior A") corresponds to regular HARQ retransmission with a regular HARQ feedback after the PUSCH has been decoded and utilizes drx-HARQ-RTT-TimerUL in the NTN can is set to the TN value plus the UE-specific UE-gNB RTT (and NDI toggled to indicate a new transmission). Another UE behavior ("behavior B") corresponds to a blind HARQ retransmission without a HARQ feedback after the PUSCH has been decoded and utilizes drx-HARQ-RTT-TimerUL in the NTN can is set to 0 or a short value retransmissionMonitoring determined by gNB (and NDI non-toggled to indicate a retransmission). retransmissionMonitoring is the timer that specifies the timer period after which the UE looks for an uplink assignment for retransmission (including a blind retransmission) upon receiving a previous uplink assignment.

One or multiple generic or drx-HARQ-RTT-TimerUL based UE behaviors can be configured per HARQ process via RRC signaling. In an embodiment of the present disclosure, activation of a specific behavior can be based on the combination of one or more of the following quantities: (i) the HARQ enabling/disabling indicator (e.g., in a DCI), (ii) the time of the DCI assignment, (iii) NDI toggled or not, and (iv) an implicit or explicit behavior indicator in the DCI carrying the UL assignment.

In an example, a given HARQ process has only one UE behavior defined. In another example, multiple UE behaviors are specified per HARQ process. When a given HARQ process has multiple behaviors defined, a specific behavior can be activated using DCI signaling in one example and a set of rules in another example.

In an embodiment of the present disclosure, in case of DCI signaling, the HARQ feedback enabling/disabling indicator in a DCI is used to activate or choose the UE behavior. For example, if the HARQ feedback is enabled per DCI signaling, the UE uses behavior A that involves the use of drx-HARQ-RTT-TimerUL set to the TN value plus UE-specific UE-gNB RTT. In another example, if the HARQ feedback is disabled per DCI signaling, the UE uses behavior B that involves the use of drx-HARQ-RTT-TimerUL set to 0 or retransmissionMonitoring.

Figure 10:
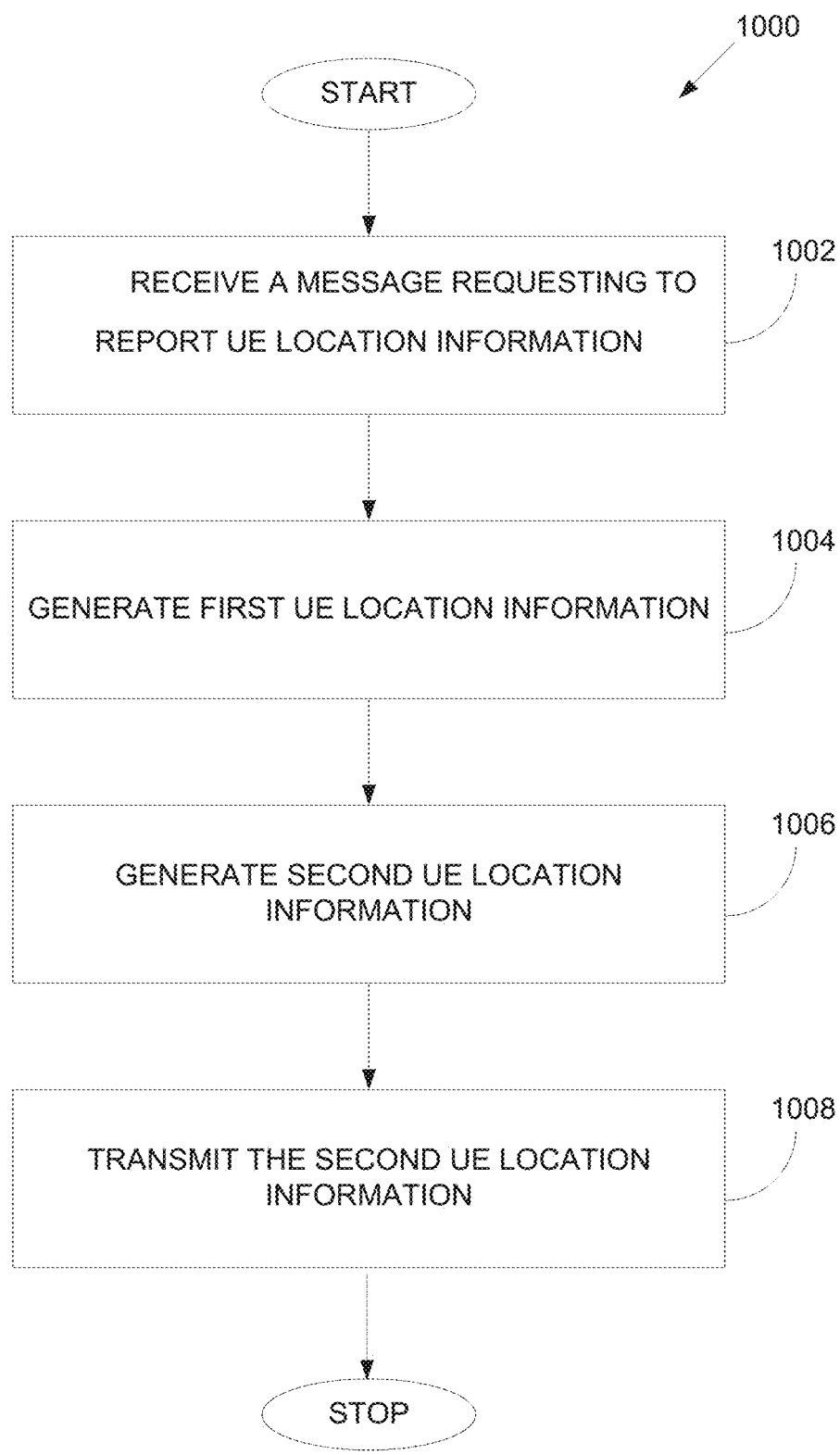
FIG. 10 illustrates a flow chart of UE method for reporting UE location information according to embodiments of the present disclosure.

FIG. 10 illustrates a flow chart of UE method 1000 for reporting UE location information according to embodiments of the present disclosure. The UE method 1000 as may be performed by a UE (e.g., 111-116 as illustrated in FIG. 1). An embodiment of the UE method 1000 shown in FIG. 10 is for illustration only. One or more of the components illustrated in FIG. 10 can be implemented in specialized circuitry configured to perform the noted functions or one or more of the components can be implemented by one or more processors executing instructions to perform the noted functions.

As illustrated in FIG. 10, a method of a UE for reporting UE location information begins at step 1002. In step 1002, the UE receives, from a BS in an NTN, a message requesting to report the UE location information.

In one embodiment, in step 1002, the message is received via a UE RRC message after an AS security function is activated or system information before the AS security function is activated.

In one embodiment, the UE location information includes UE location coordinate information comprising at least one of a latitude value, a longitude value, or an altitude value.

In such embodiment, the latitude value, the longitude value, and the altitude value correspond to a same or different reference value.

Subsequently, in step 1004, the UE generates, based on a positioning operation, first UE location information.

In one embodiment, in step 1004, the positioning operation is based on a GNSS.

Next, in step 1006, the UE generates second UE location information that is derived from the first UE location information.

In one embodiment, in step 1004 and step 1006, the first UE location information is location information of the UE acquired from a GNSS of the UE and the second UE location information is coarse location information of the UE that is based on at least one reference value and the first UE location information.

In such embodiment, the at least one reference value corresponds to at least one of a latitude value, a longitude value, or an altitude value.

Finally, in step 1008, the UE transmits, to the BS, the second UE location information as the UE location information.

In one embodiment, the UE receives, from the BS, the at least one reference value via a UE dedicated RRC message or system information or identifies the at least one reference value that is pre-configured or is based on a fixed rule.

The above flowcharts illustrate example methods that can be implemented in accordance with the principles of the present disclosure and various changes could be made to the methods illustrated in the flowcharts herein. For example, while shown as a series of steps, various steps in each figure could overlap, occur in parallel, occur in a different order, or occur multiple times. In another example, steps may be omitted or replaced by other steps.

Although the present disclosure has been described with exemplary embodiments, various changes and modifications may be suggested to one skilled in the art. It is intended that the present disclosure encompass such changes and modifications as fall within the scope of the appended claims. None of the description in this application should be read as implying that any particular element, step, or function is an essential element that must be included in the claims scope. The scope of patented subject matter is defined by the claims.

What is claimed is:

1. A user equipment (UE), the UE comprising:
a transceiver configured to receive, from a base station (BS) in a non-terrestrial network (NTN), a message for requesting to report coarse location information; and
a processor operably coupled to the transceiver, the processor configured to identify, based on global navigation satellite system (GNSS) coordinates, the coarse location information,
wherein the transceiver is further configured to transmit, to the BS, a report message including the coarse location information, and
wherein the coarse location information of the UE is obtained based on at least one reference value comprising a relative value and an absolute value, the relative value being transmitted after the absolute value.

2. The UE of claim 1, wherein the transceiver is further configured to receive, from the BS, the message via a radio resource control (RRC) message after an access stratum (AS) security function is activated.

3. The UE of claim 1, wherein a positioning operation is performed based on a GNSS.

4. The UE of claim 1, wherein the coarse location information is identified based on at least one of a latitude value or a longitude value.

5. The UE of claim 1, wherein the coarse location information of the UE is further obtained based on UE location information acquired from a GNSS of the UE.

6. The UE of claim 5, wherein the at least one reference value corresponds to at least one of a latitude value, a longitude value, or an altitude value.

7. The UE of claim 6, wherein the latitude value, the longitude value, and the altitude value correspond to a same or different reference value.

8. The UE of claim 5, wherein:
the transceiver is further configured to receive, from the BS, the at least one reference value via a radio resource control (RRC) message or system information; or
the processor is further configured to identify the at least one reference value that is pre-configured or is based on a fixed rule.

9. A base station (BS) for receiving UE location information, the BS comprising:
a processor; and
a transceiver operably coupled with the processor, the transceiver configured to:
transmit, to a user equipment (UE) in a non-terrestrial network (NTN), a message for requesting to report coarse location information, and
receive, from the UE, a report message including the coarse location information,
wherein the coarse location information is identified based on a global navigation satellite system (GNSS) coordinates, and
wherein the coarse location information of the UE is obtained based on at least one reference value comprising a relative value and an absolute value, the relative value being received after the absolute value.

10. The BS of claim 9, wherein the transceiver is further configured to transmit, to the UE, the message via a radio resource control (RRC) message after an access stratum (AS) security function is activated.

11. The BS of claim 9, wherein:
a positioning operation is performed based on a GNSS;
the coarse location information is identified based on at least one of a latitude value or a longitude value;
the coarse location information of the UE is obtained based on UE location information acquired from a GNSS of the UE;
the at least one reference value corresponds to at least one of a latitude value, a longitude value, or an altitude value; and
the latitude value, the longitude value, and the altitude value correspond to a same or different reference value.

12. The BS of claim 11, wherein:
the transceiver is further configured to transmit, to the UE, the at least one reference value via a radio resource control (RRC) message or system information; or
the at least one reference value is, at the UE, pre-configured or is based on a fixed rule.

13. A method of a user equipment (UE), the method comprising:
receiving, from a base station (BS) in a non-terrestrial network (NTN), a message for requesting to report coarse location information;

identifying, based on global navigation satellite system (GNSS) coordinates, the coarse location information; and transmitting, to the BS, a report message including the coarse location information, wherein the coarse location information of the UE is obtained based on at least one reference value comprising a relative value and an absolute value, the relative value being transmitted after the absolute value.

14. The method of claim 13, further comprising receiving, from the BS, the message via a radio resource control (RRC) message after an access stratum (AS) security function is activated.

15. The method of claim 13, wherein a positioning operation is performed based on a GNSS.

16. The method of claim 13, wherein the coarse location information is identified based on at least one of a latitude value or a longitude value.

17. The method of claim 13, wherein the coarse location information of the UE is further obtained based on UE location information acquired from a GNSS of the UE.

18. The method of claim 17, wherein the at least one reference value corresponds to at least one of a latitude value, a longitude value, or an altitude value.

19. The method of claim 18, wherein the latitude value, the longitude value, and the altitude value correspond to a same or different reference value.

20. The method of claim 17, further comprising:

receiving, from the BS, the at least one reference value via a radio resource control (RRC) message or system information; or identifying the at least one reference value that is preconfigured or is based on a fixed rule.

* * * * *